United States Patent
Tamir et al.

(10) Patent No.: US 10,262,692 B2
(45) Date of Patent: Apr. 16, 2019

(54) METHOD AND SYSTEM FOR AUTOMATIC TELEVISION PRODUCTION

(71) Applicant: PIXELLOT LTD., Petach Tikva (IL)

(72) Inventors: Miki Tamir, Tel Aviv (IL); Gal Oz, Kfar Saba (IL); Tal Ridnik, Petach-Tikva (IL)

(73) Assignee: PIXELLOT LTD., Petach Tikva (IL)

( * ) Notice: Subject to any disclaimer, the term of this patent is extended or adjusted under 35 U.S.C. 154(b) by 212 days.

(21) Appl. No.: 15/300,291

(22) PCT Filed: Mar. 31, 2015

(86) PCT No.: PCT/IL2015/050346
§ 371 (c)(1),
(2) Date: Sep. 29, 2016

(87) PCT Pub. No.: WO2015/151095
PCT Pub. Date: Oct. 8, 2015

(65) Prior Publication Data
US 2017/0178687 A1    Jun. 22, 2017

Related U.S. Application Data

(60) Provisional application No. 61/974,460, filed on Apr. 3, 2014.

(51) Int. Cl.
*H04N 5/93*    (2006.01)
*G11B 27/00*    (2006.01)
(Continued)

(52) U.S. Cl.
CPC ........ *G11B 27/036* (2013.01); *G06K 9/00718* (2013.01); *G06K 9/00744* (2013.01);
(Continued)

(58) Field of Classification Search
USPC .......................... 386/278, 280, 282, 285, 228
See application file for complete search history.

(56) References Cited

U.S. PATENT DOCUMENTS

| | | | | |
|---|---|---|---|---|
| 5,745,126 A | * | 4/1998 | Jain ...................... | H04N 13/139 382/154 |
| 7,796,155 B1 | * | 9/2010 | Neely, III .......... | G06K 9/00771 345/418 |

(Continued)

FOREIGN PATENT DOCUMENTS

| | | |
|---|---|---|
| EP | 1480450 | 11/2004 |
| JP | H0746582 | 2/1995 |

(Continued)

OTHER PUBLICATIONS

Qihe et al, Automatic Camera Calibration for images of Soccer Match, 2007.*

(Continued)

*Primary Examiner* — Daquan Zhao
(74) *Attorney, Agent, or Firm* — Pearl Cohen Zedek Latzer Baratz LLP

(57) ABSTRACT

It is provided a method for a computerized, server autonomously producing a TV show of a sports game in a scene. The method includes receiving from several video cameras a stream of video images of the scene for capturing a panoramic view of the scene, analyzing the stream of video images for allowing definition of several frame streams, determining location data of the frame streams accordingly, and rendering an active frame stream with images imaging a respective portion of the panoramic view of the scene. The method includes also transmitting for broadcasting a stream of image frames imaging the respective portion of the panoramic view. The step of analyzing the stream of video images includes identifying a playing object, tracking the playing, object and identifying players. The method also (Continued)

includes calibrating the cameras using points in the playing field. The method may include analyzing the stream of video images for identifying an event in the scene for switching between the active frame stream and a different frame stream. Also, the method may include directing a directed sensor to a region of interest in accordance with location data of the active, frame stream.

9 Claims, 6 Drawing Sheets

(51) Int. Cl.
| | |
|---|---|
| G11B 27/036 | (2006.01) |
| H04N 5/262 | (2006.01) |
| H04N 5/073 | (2006.01) |
| H04N 5/247 | (2006.01) |
| H04N 5/232 | (2006.01) |
| H04N 17/00 | (2006.01) |
| H04N 21/218 | (2011.01) |
| H04N 21/2187 | (2011.01) |
| H04N 5/77 | (2006.01) |
| G06K 9/00 | (2006.01) |

(52) U.S. Cl.
CPC ....... *H04N 5/0733* (2013.01); *H04N 5/23238* (2013.01); *H04N 5/247* (2013.01); *H04N 5/262* (2013.01); *H04N 5/77* (2013.01); *H04N 17/002* (2013.01); *H04N 21/2187* (2013.01); *H04N 21/21805* (2013.01)

(56) References Cited

U.S. PATENT DOCUMENTS

2003/0179294 A1* 9/2003 Martins .................. G01S 3/781
 348/157
2007/0279494 A1* 12/2007 Aman ................... G01S 3/7864
 348/169
2008/0312010 A1* 12/2008 Marty ................ A63B 24/0003
 473/447
2009/0284601 A1* 11/2009 Eledath .................. G06K 9/209
 348/157
2011/0267461 A1* 11/2011 Birenboim .............. G06T 7/292
 348/142
2012/0013711 A1 1/2012 Tamr et al.
2012/0057852 A1 3/2012 Devleeschouwer et al.

FOREIGN PATENT DOCUMENTS

| | | |
|---|---|---|
| JP | 2004046647 | 2/2004 |
| JP | 2006040199 | 2/2006 |
| WO | WO 2014/024475 | 2/2014 |
| WO | WO 2014/191990 | 12/2014 |

OTHER PUBLICATIONS

Vasanth et al, Detecting Semantic Events in Soccer Games: Towards a Complete Solution, 2001.*
Ariki et al; Digital Camera Work for Soccer Video Production with Event Detection and Accurate Ball Tracking by Switching Search Method; Multimedia; 2010, Chapter 10.
Search Report dated Jul. 28, 2015 for corresponding International Application No. PCT/IL2015/050346.
Search Report dated Mar. 13, 2017 for corresponding European Application No. 15772324.8.
The transactions of the institute of electronics, information and communication engineers D-11; vol. J86-D-11, No. 3, Mar. 2003.
Technical Report, the Institute of Image Information and Television Engineers (ITE), vol. 37, No. 36, Aug. 12, 2013.
Information Technology Letters, The Institute of Electronics, Information and Communication Engineers and Information Processing Society of Japan, vol. 5., 2006.
Office Action dated Jan. 8, 2019 for Japanese application No. 2016-559211.

* cited by examiner

METHOD AND SYSTEM FOR AUTOMATIC TELEVISION PRODUCTION

CROSS REFERENCE TO RELATED APPLICATION

This application is related to and claims priority from U.S. Provisional Application Ser. No. 61/974,460 filed on Apr. 3, 2014, entitled "METHOD AND SYSTEM FOR AUTOMATIC TELEVISION PRODUCTION," the disclosure of which is incorporated herein by reference in its entirety.

BACKGROUND OF THE INVENTION

Field of the Invention

The present disclosed subject matter is directed to methods and systems for automatic outdoors television productions. In special, the disclosure deals with television production of sports events.

Description of Related Art

Television coverage of sports is spreading to sports events, which in the past were not covered. A traditional television production is based on several cameras in the field, operated by several cameramen, and a director selecting one camera for viewing at any one time. However, the cost of a such full venue production including a large team and several cameras prohibits high quality coverage. On the other hand, home viewers expect comprehensive television coverage including replays of portions of the event. Production cost may be reduced by replacing some or all the manual processes involved in the production by automatic processes.

BRIEF SUMMARY OF THE INVENTION

The present invention is based on fully automatic operation of cameras by a server deployed in or close to the field. Several cameras capture a panoramic view of the playing field. The server uses the captured images to operate virtual camera, the leading camera "camera 1" for example, thus replacing cameramen. The server also switches between virtual cameras. In addition, the server uses directed sensors which are also deployed in the field.

The present invention provides a computer-implemented method for producing a video scene. The method includes receiving, from several video cameras, a stream of video images of the scene for capturing a panoramic view of the scene, analyzing the stream of video images, and determining location data of frame streams in accordance with the analyzing. The method also includes rendering an active frame stream of the one or more frame streams with images corresponding to a portion of the panoramic view of the scene, based on the location data. Thus, the method enables transmitting for broadcasting the rendered stream of image frames corresponding to the respective portion of the panoramic view. The step of analyzing the images includes identifying a primary object in the stream of video images, tracking the primary object, and identifying at least one secondary object associated with the primary object.

In some embodiments, the method, includes calibrating the cameras using points in a playing field. Exemplary points are corners of the playing field, crossings of two field lines, 11 m penalty kick point, beacon points deployed in the playing field and having locations determined by geodic devices, and a bench related point.

In some embodiments, a parameter set defines a frame stream by parameters relating to location, digital zooming, and time. Location parameters include a left angle, a right angle, a bottom angled a top angle, a central angular coordinate, a central location coordinate, an aspect ratio, and a frame width. Zooming parameters are a fixed zoom parameter, parameters of an equation defining a dependence of a zoom parameter on a timestamp, and a table of zoom parameter versus a timestamp. Temporal parameters include a current time flag, a start timestamp, a final timestamp, a frame rate, and a resolution parameter. Preferably, the frame width is determined, for example, by a predetermined width, a predetermined number of players in the frame, a prohibition flag related to exceeding playing field boundaries, and a demand flag related to including a key static object in the frame.

In some embodiments, the method includes estimating a region occupying a playing object upon losing the playing object, and modifying the frame stream to include the region.

In some embodiments, the method includes validating the identification of a playing object at a certain time in a certain location, by estimating a probability of playing object presence thereof in view of a playing object orbit before the certain time.

In some embodiments, the method includes determining a frame center in accordance with variables like a playing object location, and a center of mass of player locations.

In some embodiments, the method includes smoothing a playing object orbit, and determining a center frame in accordance with the smoothed playing object orbit, thus preventing jerky movement of a frame center orbit.

In some embodiments, the method includes identifying a fast break in a basketball match, estimating a ball speed, and selecting a location of a frame for blocking a player group in dependence on the ball speed. A front side of the fast break is selected in case of a fast ball, and a rear side thereof is selected in ease of a slow ball.

In some embodiments, frames are determined by a rectangle blocking a predetermined portion of the players.

The present invention also provides a method for a computerized server autonomously producing a TV show of a sports game in a scene. The method includes receiving from several cameras a stream of video images of the scene for capturing a panoramic view of the scene, providing several parameter sets defining several respective frame streams, selecting an initial active frame stream in accordance with a predetermined rule. The method further includes rendering the active frame stream with images corresponding to a respective portion of a panoramic view of the scene in accordance with the respective parameter set of the selected frame stream. Thus the method enables transmitting for broadcasting the rendered, stream of image frames corresponding to the respective portion of the panoramic view. The method also includes analyzing the stream of video images for identifying an event in the scene for switching between the active frame stream and a different frame stream, and replacing the active frame stream by the different frame stream.

In some embodiments, most of the time, all frame streams, let alone the active frame stream, having no rendered images.

Exemplary events are a match start-up, a match end, a match break, a time-out start, a time-out end, an 11 meter penalty kick, a break end, an offside, a corner kick, a free kick, and throw-in. The event may be either an occurring event or an event expected to occur.

In some embodiments the respective plurality of frame streams are associated to respective views. Exemplary views are a broad playing object view, a narrow playing object view, two fixed gate views, two fixed basket views, several fixed audience view, several replay views, and a moving camera view. Preferably, a replacement of a frame stream associated with a broad playing object view by a frame stream associated with a narrow playing object view is triggered by a decrease of playing object speed to a speed under a predetermined value for at least a predetermined time period. The replacement may also be triggered by an event of a static playing object waiting to an identified game situation.

In some embodiments, the method includes switching to a replay frame stream for presenting, a replay of an identified dramatic event.

In addition, the present invention provides a method for a computerized server autonomously producing a TV show of a sports match in a scene, enhanced by directed sensors. The method includes receiving from several video cameras a stream of video images of the scene for capturing a panoramic view of the scene, and defining several frame streams by location data in accordance with predetermined rules and with analysis of the stream of video images. The method further includes selecting an active frame in accordance with a predetermined procedure and, in accordance with an analysis of the stream of video images, and directing a directed sensor to a region of interest in accordance with location data of the active frame stream.

In some embodiments, the method includes rendering an active frame stream with images corresponding to a respective portion of the panoramic view of the scene, and transmitting for broadcasting the rendered stream of image frames.

In some embodiments, the method includes analyzing the stream of video images for allowing definition of the frame streams.

In some embodiments the method includes analyzing the stream of video images in accordance with predetermined criteria characterizing situations occurring in the scene, identifying a situation occurring in the region of interest as being characterized by a criterion, and triggering actions related to the directed sensor. Exemplary actions are capturing a signal using the directed sensor, and broadcasting the captured signal.

In some embodiments, the method includes calibrating a pan-tilt-zoom (PTZ) video camera in reference to the scene to allow directing the PTZ video camera to the region of interest in accordance with the location data. Preferably, the method includes calibrating pan and tilt angles of the PTZ camera while being pointed on two or more points in the scene. Preferably, the method includes directing the PTZ video camera to the region of interest for capturing a video signal thereof.

In some embodiments, the method includes directing a directional microphone to the region of interest and recording an audio signal generated thereof. Preferably, the method further includes selecting the audio signal generated thereof for broadcasting as an audio signal of a broadcasted stream of images associated with the active frame stream.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

DETAILED DESCRIPTION OF THE INVENTION

Figure 1A:
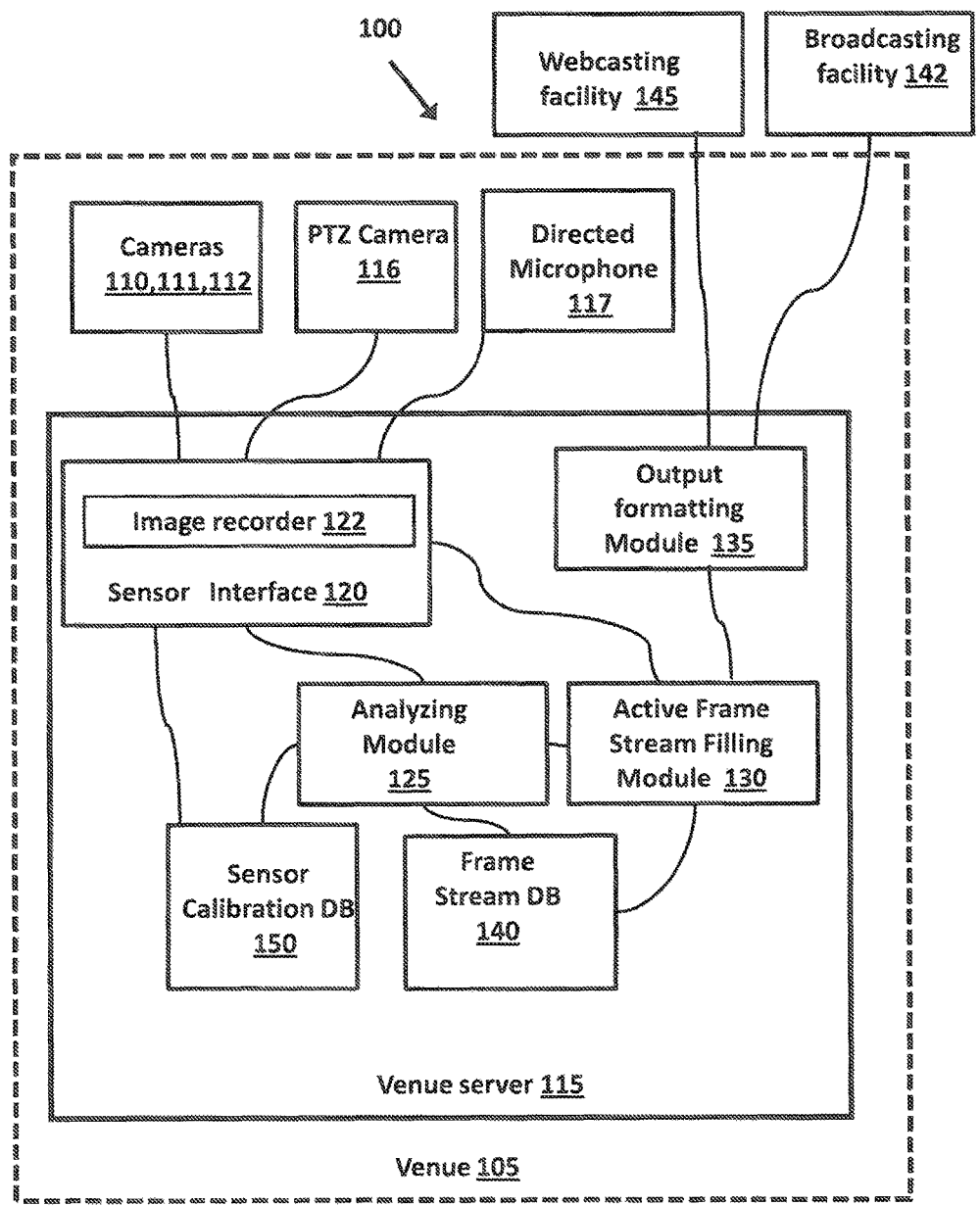
FIG. 1a is a block diagram of an automatic television production system.

The present invention will now be described in terms of specific example embodiments. It is to be understood that the invention is not limited to the example embodiments disclosed. It should also be understood that not every feature of the methods and systems is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not, intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

Definitions

The terms field of view, hereafter FOV, and region of interest are used throughout this disclosure for describing a desired region in the scene of potential interest for viewers of the produced TV show.

a panoramic view is a broad angle field of view encompassing a whole scene of the playing field and the audience.

a frame is a rectangle which defines a desired region of interest for broadcasting, as a portion of the panoramic view.

a frame stream is a data record which defines location data and temporal data of a fixed or variable portion of a panoramic view for certain limited or unlimited temporal duration. A frame stream is usually empty from images while it is not on, air or active. Thus, the size of a computer memory needed to store a frame stream is tiny relative to a stream of respective images of an active frame.

an image stream is provided by one or more real cameras or by a virtual camera.

a virtual camera is a frame stream which, upon activation, is rendered with images of a portion of a panoramic view.

The present disclosure is complementary to the remote proxy video production invention described in International publication number WO 2014/191990 entitled "METHOD AND SYSTEM FOR LOW COST TELEVISION PRODUCTION", the disclosure of which is incorporated herein by reference in its entirety.

Referring now to FIG. 1a, there is described a system 100 for low cost automatic television production, which includes a data server 115 in a venue 105, several sensors which capture a panoramic view of a playing field of a sports game, and facilities to broadcast the TV production. In the following, an automatic method to operate a virtual camera, leading camera "camera 1" for example, is described, thus replacing a cameraman. Then, an automatic method for switching between virtual cameras is outlined. Finally, an enhanced method for automatic TV production using directed sensors is described.

Figure 1B:
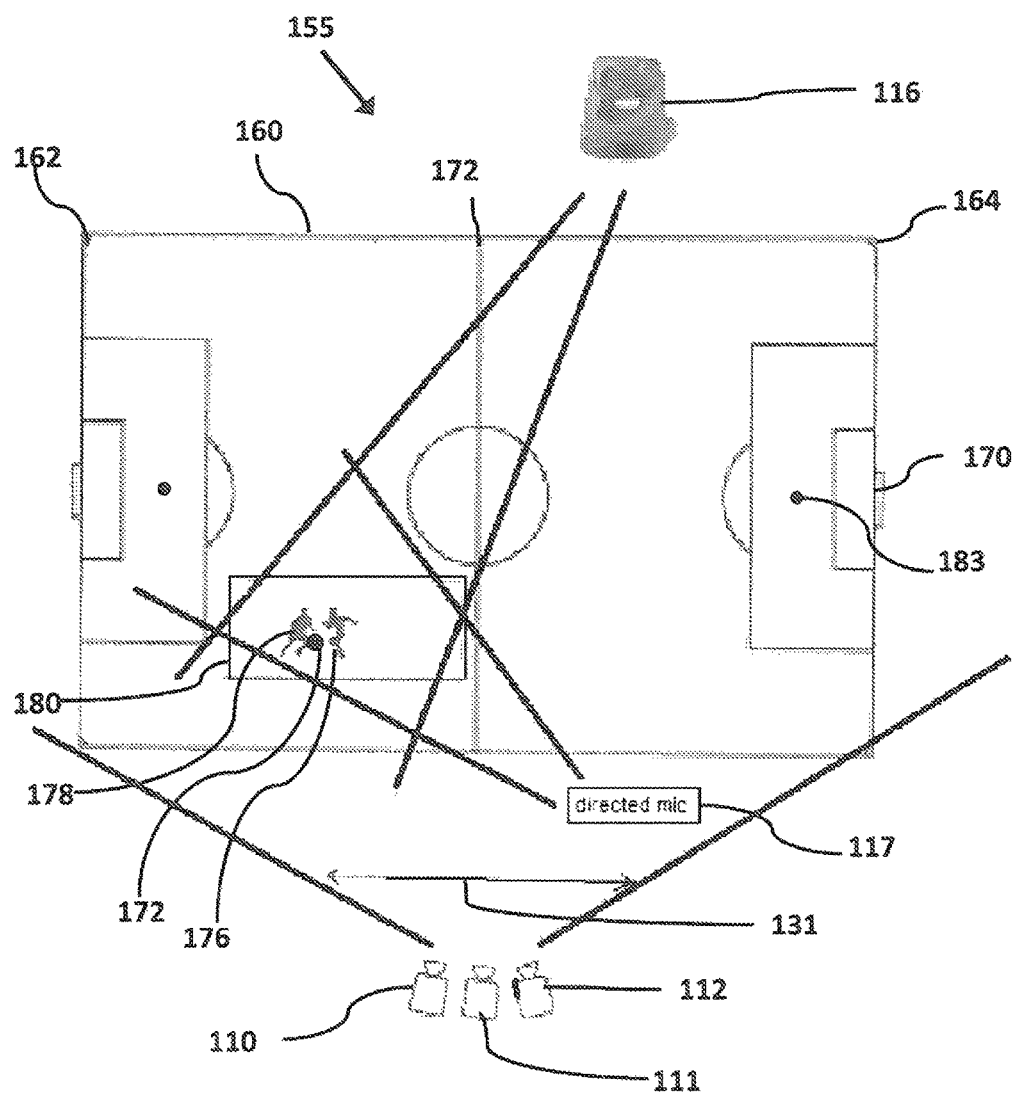
FIG. 1b illustrates a soccer playing field equipped with several sensors capturing images and audio signal for automatic television production.
Figure 2A:
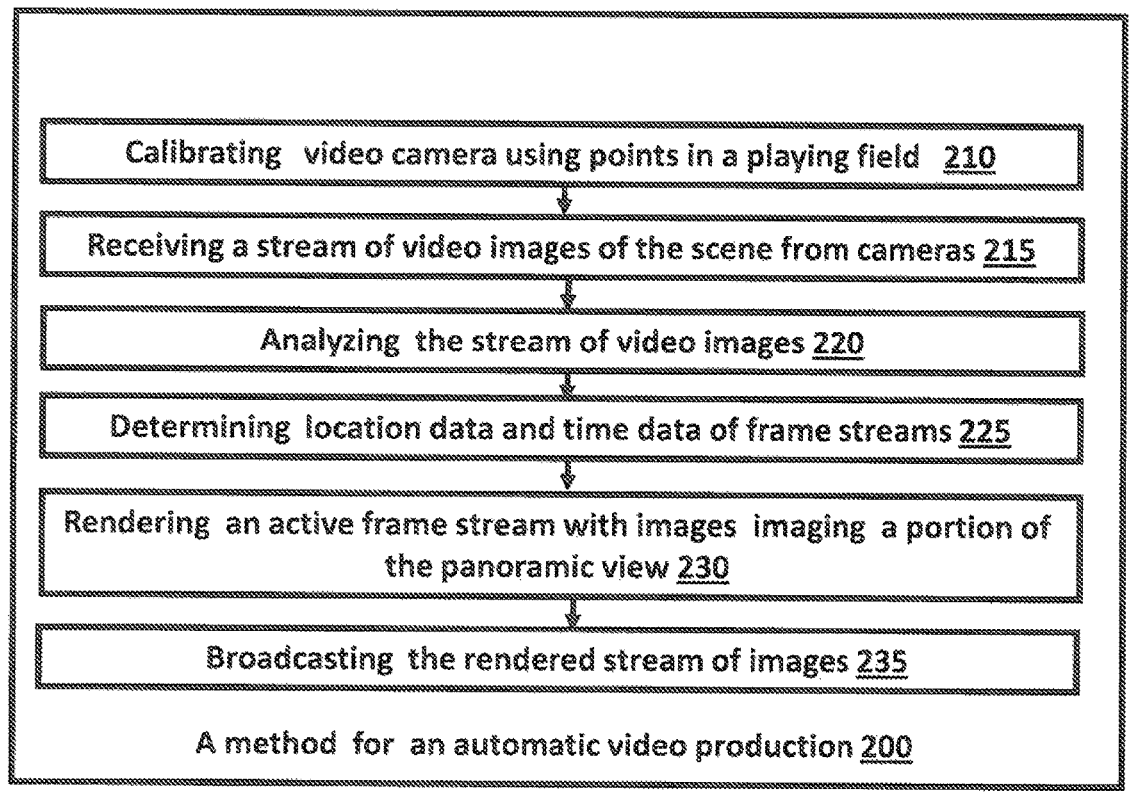
FIG. 2a is a flow chart of a method for automatic television production.
Figure 2B:
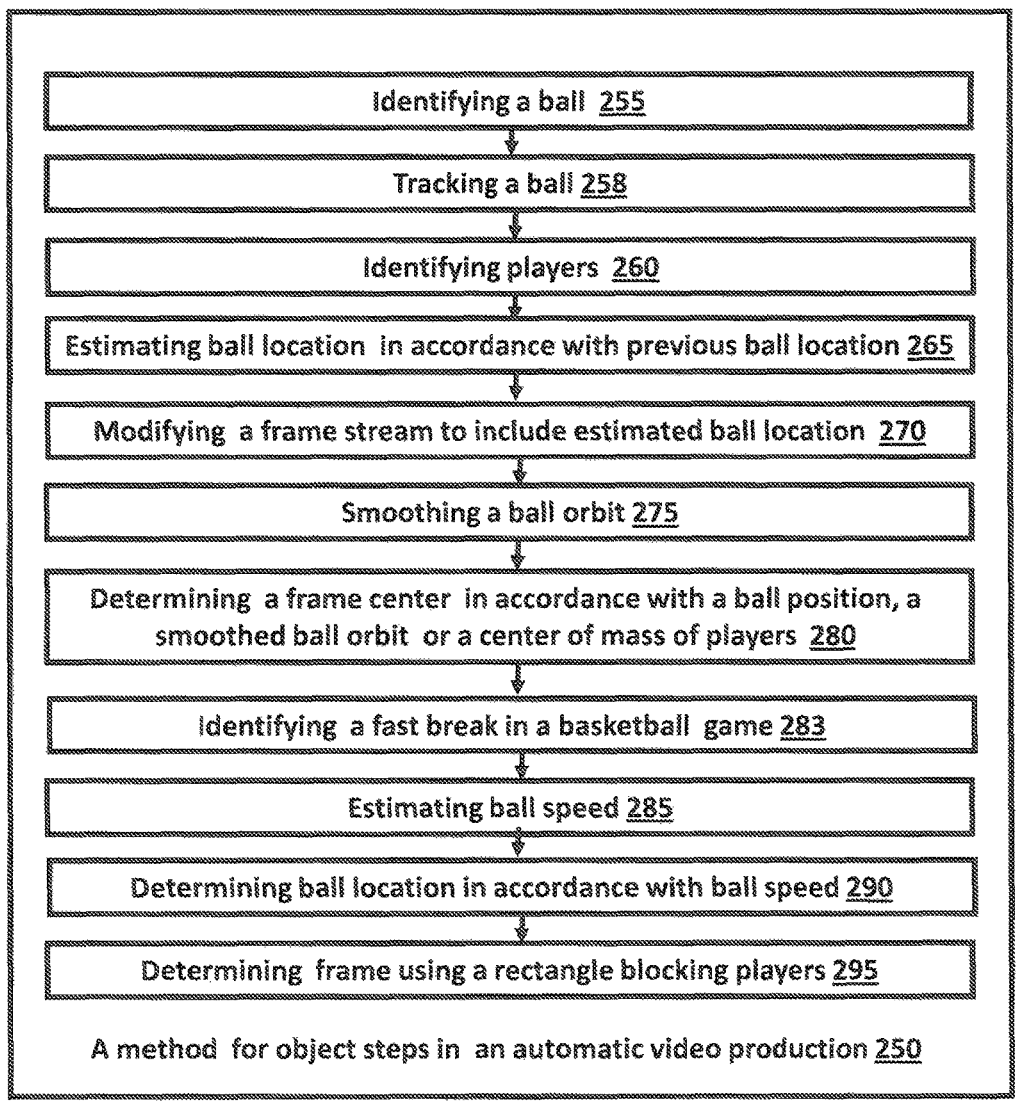
FIG. 2b is a flow chart of object steps in a method for automatic television production.

Automatic Operation of a Virtual Camera (FIGS. 1a, 1b, 1b, 2b)

A system for automatic TV production is illustrated in the venue 100 of FIG. 1a and a scene 155 of FIG. 1b. In a scene 155, three fixed cameras 110, 111 and 112 combine to capture a panoramic view 131 of a selected location, for example, a playing field, such as a soccer field 160. In addition, a pan-tilt-zoom (hereafter PTZ) camera 115 may be directed to a region of interest (ROI) in the field, ROI 180 for example, from a different direction. Thus, PTZ camera 115 may provide a real close-up of an event occurring in the field. Also, a directed microphone 117 may be aligned to an ROI in the field, ROI 180 in the example of FIG. 1b, to capture audio signal generated thereof, like shouts of players 176 and 178.

The cameras 110, 111, and 112 are frame synchronized. Each camera is capturing video images of a certain zone of the scene 155. A lens is adjusted for each camera to fully cover the zone. Optionally, a method of optimal coverage of the venue composed of lenses with a variety of focal lengths and cameras with different number and size of horizontal and vertical pixels may be used by packing simulation techniques. Typically, neighboring (adjacent) cameras have overlapping coverage zones.

The cameras 110, 111, and 112 may be CMOS (complementary metal-oxide-semiconductor) or CCD (semiconductor charge-coupled devices) cameras. Each camera may be composed of a single or multiple, e.g., three, imagers. Preferably, the cameras are of industrial grade. The data output format of the cameras can be GigE, USB 3.0, Camera Link, HD-SDI or any other format available for such cameras.

A single wide angle camera 111 may provide a panoramic view, despite being the only sensor capturing the scene.

As shown in FIG. 1a, sensors 110-112, 116 and 117 are communicating with a sensor interface 120 of the venue server 115, which in turn, feeds a broadcasting facility 142 or a webcasting facility 145 via an output formatting module 135. Data transmission from the cameras 110-112 to the data server 115 may be done via optical cable or any other wired or wireless communication system. In a preferred embodiment, the cameras 110-112 have GigE output and a network switch with fiber optical cable used to transfer the data to the data server 115. The cameras data can also be transferred using the worldwide web.

The venue server 115 includes the following modules:

A sensor interface 129 to grab and initially process the camera data. This initial processing may be composed of cameras, photometric and geometrical calibration, and image transformation and image enhancement processes such as high pass filtering and color correction. The photometric calibration process is preferably frequently repeated during the match. Typically, it is repeated every few seconds but in principle it may be done every frame or not done at all during an entire match. Such initial processing may also be done in by cameras 110-112 or in the active frame filling module 130.

An image recorder 122 stores at, least a portion of the data acquired by the sensor interface 120. The recorder 122 is composed of either hard disks, flash memory modules or any other means for massive fast data storage. Recorder 122 stores the data for the live production, for replays, for post production as well as for other applications.

An analyzing module 125 analyzes the images received from the sensor interface 120 to "interpret" the captured match, align the frame streams by feeding frame stream database 140, determine the active frame stream, and switch to signals captured by the directed sensors 116 and 117 as described below. Module 125 also calibrate the sensors 110-112, 116 and 117 and stores calibration data in a sensor calibration database 150.

A frame stream data base 140 stores parameter sets or data records, each of which defines a frame stream by parameters related to location, zooming and time. The database 140 is a virtual equivalent of a split screen or a video monitor array used by real director to supervise, control and switch between leading cameras, fixed cameras, replay machines, etc. A parameter set defines the frame stream sufficiently, such that once the analyzing module 125 decides to launch the respective frame stream on air, module 130 is able to fill it with images.

An active frame stream filling module 130 retrieves the required data from the image recorder 122 and performs pixel operations on the acquired data, such as geometrical image alignment, aberrations correction, vignetting correction, alignment, stitching zones blending, "minimum difference" stitching line drawing and a variety of image filter operations. The module 130 transmits the matrix of pixels filling the frame of the active frame stream as determined by an, analyzing module 125. This process is performed for each frame. The rendered image frames are characterized by non perceptible or seamless boundaries between neighboring raw images. For that sake, stitching lines are transformed from world coordinates to camera coordinates for specifying the lines in the frame or close thereof. Then, pixels belonging to neighboring video cameras are geometrically aligned using calibration parameters. Also, pixel pairs in stitching zones belonging to neighboring video cameras are blended in accordance with a distance from a stitching line. In addition, color intensities of pixels belonging to different video cameras are corrected, and hue, saturation, intensity and gamma value of the entire image frame is adjusted.

An output formatting module 135 formats a stream of image frames in the required video standard and transmits it to the TV station studio 142 or directly to the TV viewers using satellite, cable or any other broadcast transmission method. Additional destination with increasing popularity nowadays is a webcast media 145 allowing users to view the streamed presentation over the internee. The signal can also be directed to an individual web client, a borne user, directly or via a cloud server.

Referring now to the flow chart of FIG. 2a, it depicts a method 200 for an automatic video production. Prior to the match, in a step 210, the server 115 calibrates the video cameras 110-112, as well as PTZ camera 116 using points in the playing field 160. Exemplary points are corners 162 and 164 of the soccer field 160, crossings of two field lines 172, 11 m penalty kick spot 183, beacon points deployed in the playing field and having locations determined by geodic devices, and a bench related point. The calibration data is stored in a sensor calibration database 150.

The calibration data of the cameras and geometrical calculation, known in the art, are used for two tasks. First, the images received from the cameras are associated to each other such, as to define the Panoramic view. Secondly, the location data of a frame stream is related to angular or Cartesian coordinates of the panoramic view.

The server 115 uses frame streams as virtual cameras, counterparts of real cameras in a traditional TV production of sports games. The frame streams are stored in respective parameter sets or data records in a frame stream database 140. A parameter set defines a frame stream by parameters related to location, zooming and time.

Typical location parameters are a left angle, a right angle, a bottom angle, a top angle, a central angular coordinate, a central location coordinate, an aspect ratio, a frame width, and a resolution parameter. The aspect ratio may have a fixed value of 16:9.

Typical zooming parameters are a fixed zoom parameter, parameters of an equation defining a dependence of a zoom parameter on a timestamp, and values in a table of zoom parameter versus a timestamp. The zoom value is used for digital zooming of the panoramic view using the images captured by cameras 110-112 which may be fixed cameras without any real zoom capability.

Typical temporal parameters are a current time flag, a start timestamp, a final timestamp, and a frame rate. A positive current, time flag indicates that the frame stream follows real time as much as possible.

Frame width may be a predetermined fixed width for fixed cameras like agate or a basket camera. For other frame streams, the frame width fulfills a certain, condition. One exemplary condition is that a predetermined number of players is present in the frame. Another exemplary condition is that the frame does not exceed playing field boundaries. A third exemplary condition is that a key static object like a gate 170 or a basket is included in the frame.

In a step 215, the sensor interface 120 receives from video cameras 110-112 a stream of video images of the playing field 160, thus capturing a panoramic view thereof. In step 220, an analyzing module 125 analyses the stream of video images for allowing definition of several frame streams. Consequently, in step 225 the analyzing module 125 determines location, zooming and time parameters of the frame streams and store them in the frame stream database 140. In step 230, a module 130 renders an active frame stream with images corresponding to a respective portion of the panoramic view of the scene.

The active frame stream may be the only frame stream, a counterpart of "a camera 1", for example. In such a case, the resulted production is the same as having a single real cameraman capturing the scene 155 in a low league match. In other cases, a leading virtual camera ("camera 1") is normally generating a wide FOV typically comprising one third of the playing field. "Camera 2" frame stream provides a tighter view of the ball vicinity. There are other virtual cameras providing close-up views on players groups or individual players. Accordingly, there are several frame streams and the executed analysis determines parameter set for most of the frame streams, while only one is an active frame stream having rendered images. The selection of an active frame stream and the switching between frame streams is further discussed in the next section.

The active frame filling module 130 adjusts the color and brightness of the images captured by cameras 110-112, which contribute to rendering the active frame stream, and transforms between images originated at different cameras from world coordinates to camera coordinates. In addition, the module 130 blends the pixels in stitching zones encompassing the stitching lines, and geometrically aligns the outputs of the different cameras 110-112 using one of the methods known in prior art for calibrating and aligning images captured by several cameras.

In step 230, output formatting module 135 formats the rendered image frame stream for broadcasting or webcasting and communicate the result streams to a broadcasting facility 142 or to a webcasting facility 145.

Referring now to FIG. 2b, a method 250 for actions related to objects in a playing field 160 is presented. The method includes a step 255 of identifying a primary object, such as a ball 172, a step 258 of tracking the object 172, a step 260 of identifying players 176 and 178 associated with, the ball 172, and a step 265 of estimating a region, occupying the hall upon losing it.

In other words, the ball 172 and the players 176 and 178 are detected and tracked throughout the play using dynamic background subtraction for creating blobs that represent the respective players. Automatic ball tracking in sports games is disclosed, for example, in US Pub. No. 2008/0312010 to Marty etal, and in US Pub. No. 2011/0267461 to Birnboim etal, Player identification is disclosed, for example, in US Pub. No. 2012/0013711 to Tamir and Wilf. Event detection and ball tracking is discussed in "Multimedia" edited by K. Nishi, 2010, Chapter 10 by Ariki and Takiguchi entitled "Digital Camera Work for Soccer Video Production with Event Detection and Accurate Ball Tracking by. Switching Search Method", Ball orbit or trajectory may be two-dimensional if the ball is captured from only one direction, or three dimensional if the ball is captured from two directions.

In a step 270, the analyzing module 125 modifies the frame stream such that a "camera 1" frame includes the region which occupies the ball. Preferably, a frame center may be determined such as to follow a ball location or to follow a center of mass of player locations. In step 275, to prevent jerky movement of a frame center, the analyzing module 125 smoothes a ball orbit. Consequently, in step 280, module 125 determines a center frame in accordance with the smoothed ball orbit.

Preferably, in a step 285, module 125 validates the identification of the ball 172 at a certain time in a certain location by estimating a probability of the ball 172 presence thereof in view of the ball orbit before the certain time.

Steps 283, 285 and 290 may be executed whenever the captured game is basketball. First, module 125 identifies a fast break, then it estimates the speed of ball 172, and finally it selects a location of a frame blocking a player group dealing with ball 172 in dependence on the ball speed. A front side of the fast break is selected in case of a fast ball, and a rear side thereof is selected in a case of a slow ball.

In step 295, module 125 determines the parameter set of a frame stream by blocking a predetermined portion of the players 176 and 178 by a rectangle. Preferably, in certain games, most of the players 176 or all of them are included in a frame stream of "camera 1". Sometimes, at least three or five players 178 are included in a frame stream.

Figure 3:
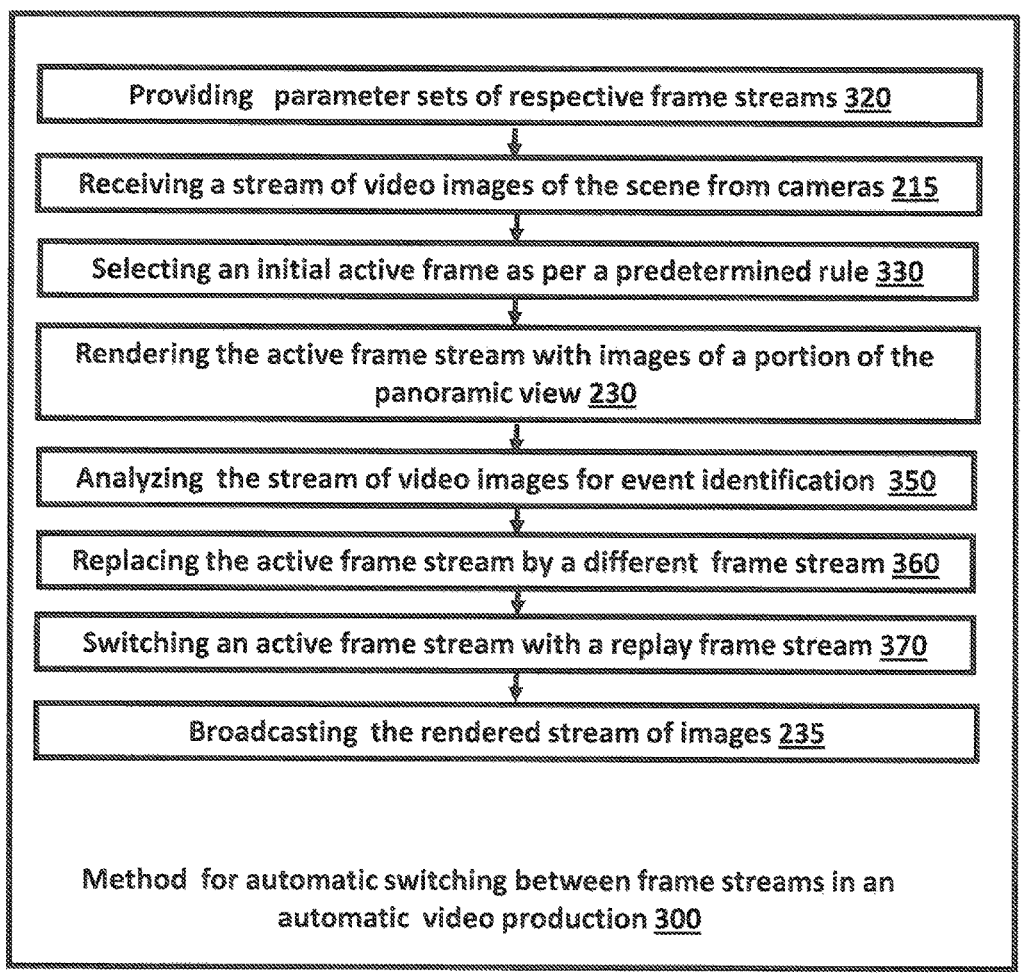
FIG. 3 is a flow chart of a method for automatic switching between frame streams in automatic television production; and, FIG. 4 is a flow chart of a method for enhancing automatic television production by directed sensors.

Automatic Director Embodiment (FIGS. 1a, 1b, 3)

FIG. 3 outlines a flow chart of a method 300 for automatic switching between frame streams in an automatic TV production of a sports game. As mentioned, above, the server 115 uses frame streams as virtual cameras, counterparts of real cameras in a traditional TV production of sports games. The frame streams are stored in respective parameter sets or data records in a frame stream database 140. A parameter set defines a frame stream by parameters related to location, zooming and time, as detailed above. Initially, in step 320, default or preliminary values are stored in frame stream database 140 for several frame streams. For example, a center of a "camera 1" frame stream may be initially set to ball position when a game starts.

The frame streams are, associated to respective views. Exemplary views are a broad ball view "camera 1" a narrow ball view "camera 2", two fixed gate views, two fixed basket views, several fixed audience view, several replay views, and a moving camera view.

In a step 215, the sensor interface 120 receives from video cameras 110-112 a stream of video images of the playing field 160, thus capturing a panoramic view thereof.

In step 330, module 125 selects an initial active frame in accordance with a predetermined rule. An exemplary rule is that the initial frame stream is "camera 1" frame stream. In step 230, module 130 renders the active frame stream with images imaging a respective portion of the panoramic view of the scene 155.

In step 350, the analyzing module 125 analyses the stream of video images, trying to identify an event which triggers switching between the active frame stream and a different frame stream. Event identification is based on player and ball identification and on familiarity with typical game situations. In soccer, for example, a throw-in event is identified as a situation when a player is standing on a touch-line with a ball over his head. Consequently, in step 360, module 125 replaces the active frame stream by a different frame stream. Module 125 also uses sports type photographing rules, like switch from "camera 1" to "camera 2", if the ball 172 is currently in the goal area or if the ball 172 is moving slowly and players 176 an 178 are crowded around the ball 172. Module 125 may also decide to switch from "camera 1" or "camera 2" to a close-up view if the ball is stationary and there is a single player close to it. Let alone the active frame stream, all frame streams having no rendered images. However, a transition between frame streams may occur gradually such that two frame streams are presented simultaneously with the old one fading out while the new one takes over. Other transition effects like wipe are also possible. The module 125 may select the desired transition in accordance with a predetermined procedure. For the short duration of the transition, two frame streams may be rendered with images simultaneously.

Exemplary events identified by module 125 are a match start-up, a match end, a match break, a time-out start, a time-out end, an 11 meter penalty kick, a break end, an offside, a corner kick, a free kick, and throw-in. The identified event may be either an occurring event or an event expected to occur.

For example, a "camera 1" frame stream is replaced by a "camera 2" frame stream once a decrease occurs of ball speed to a speed under a predetermined value for at least a predetermined time period. Typical predetermined speed value are 5, 8 10, 12 and 15 km per hour. Typical predetermined, time periods are 4, 6, 7 and 10 sec. Alternatively, module 125 identifies that the ball 172 is completely static in preparation to an identified match situation like a corner kick.

Once a dramatic event like a goal is identified, module 125 switches the active frame stream to a replay frame stream for presenting a close-up slow replay of the identified event, after which the active frame strewn is switched back to "camera 1" frame stream. In such a case, the start timestamp of the replay frame stream is several seconds before the goal kick, and the final, timestamp is several seconds after the goal, while the frame rate is one third of the regular rate, for example.

The transition between active frame streams occurs in arbitrary points of time. Usually, once an active frame stream is selected it stays on air until further selection. Sometimes, like in the case of a reply frame stream, it ends in accordance with a final timestamp and other frame stream is selected to be the active one according to a predetermined rule. For example, a rule may determine that at the end of a replay, the "camera 1" frame stream is again the active one.

Figure 4:
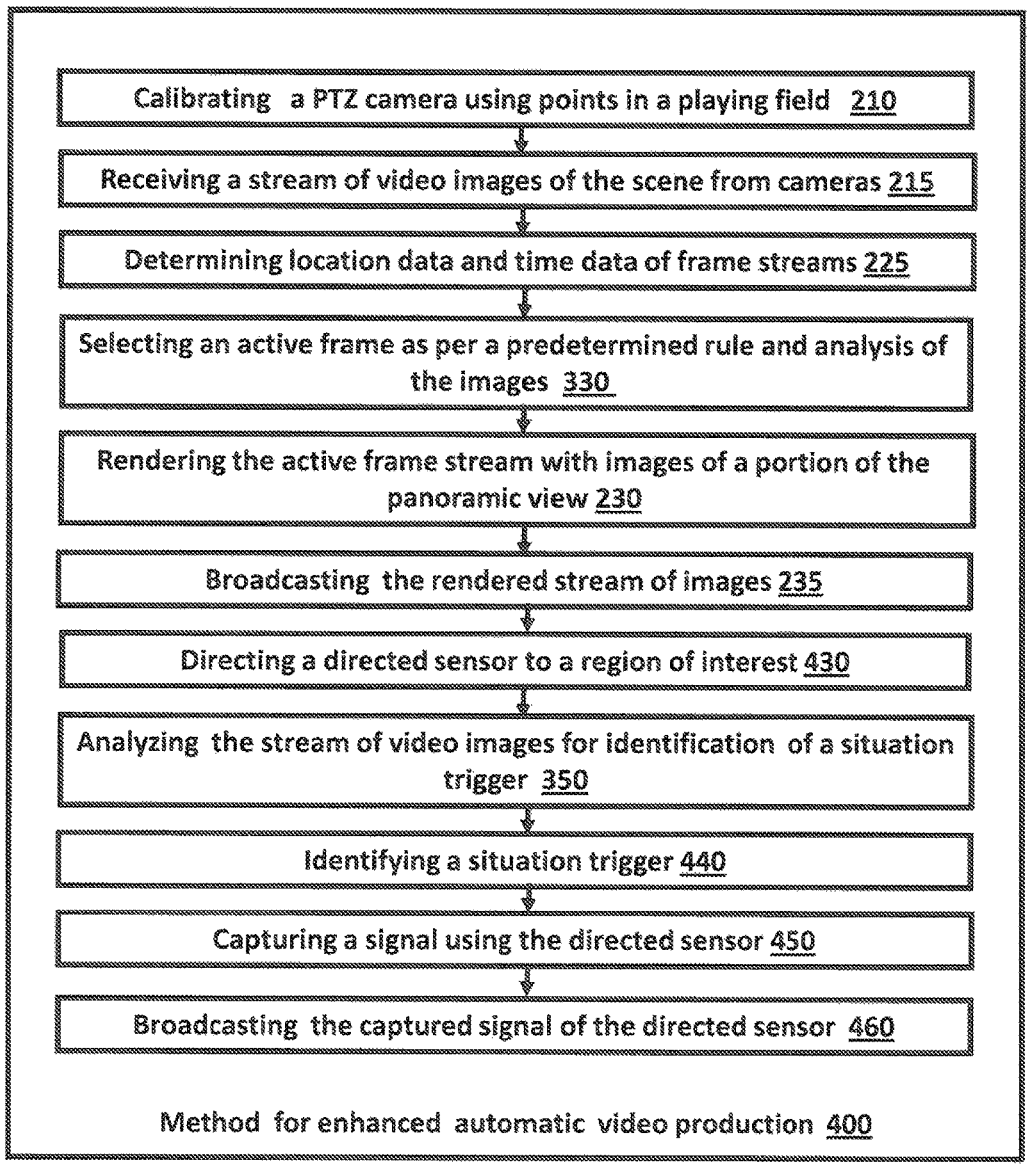

Automatic TV Production with Directed Sensor (FIGS. 1a, 1b, 4)

Sports event producers need to capture the event from more than a single perspective. With just a single array of cameras, the proposed system may have just a single perspective. It is of course possible to use multiple camera arrays, each located in its unique location in the venue. For example, in a soccer match, the production team may decide to use three camera heads and deploy the first one in a mid court position and the other two behind the respective two gates to cover the respective goal keeper. A better embodiment of the multi-perspective configuration is, based on a single camera head or a camera array composed of multiple fixed cameras covering the playing field and a camera with an automatic remotely controlled zoom lens mounted on a remotely controlled pan and tilt unit. There are many commercial pan/tilt/zoom (PTZ) cameras that can be used for this application, Panasonic WV-SC385 PTZ network camera, for example only.

An automatic sound capture device may cover the game as well. To that aim, a directional microphone 117 is mounted on a remotely controlled pan and tilt unit. The microphone 117 may be slaved to FOV coordinates compatible with a certain frame stream to cover a player or group of players related to a situation in which the capture of sound might be beneficial. Such situations may be, for example two quarreling players or a referee yelling at one of the players. Exemplary directional microphones are parabolic microphones, flat directed microphones, microphones with running wave and gradient microphones. These microphones are known in the art to provide directivity and sensitivity for capturing audio signal generated in portions of the playing field.

Referring now to FIG. 4, there is described a flow chart of a method 400 for a computerized server autonomously producing a TV show of a sports game in a scene, whereas the method is enhanced by using directed sensors in addition to fixed video cameras.

Sever 115 controls a pan-tilt-zoom (PTZ) camera 116 and a directed microphone 117 using the sensor interface 120. Directed microphone 117 is disposed on an alignable two-axis base. Before the match commences, in a step 210, analyzing module 125 calibrates the PTZ video camera 116 in reference to the scene to allow its directing to the region of interest in accordance with the location data of a frame stream. Preferably, pan and tilt angles of the PTZ camera are pointed on several points in the scene, and the calibration data is stored in a sensor calibration database 150. The stored calibration data is used to align the PTZ camera 116 in accordance with location data of a frame stream.

Later on, in a step 215, the sensor interface 120 receives from video cameras 110-112 a stream of video images of the playing field 160, thus capturing a panoramic view thereof. Consequently, in step 225, the analyzing module 125 determines location, zooming and time parameters of the frame streams and store them in the frame stream database 140. In step 330, module 125 selects an initial active frame in accordance with a predetermined rule and in accordance with an analysis of the images. In step 230, module 130 renders the active frame stream with images imaging a respective portion of the panoramic view of the scene 155, and in step 235 the rendered stream of images is broadcasted.

In a step 430, module 125 directs the directed sensor 116 or 117 to a region of interest in accordance with location data of the active frame stream. Also, in step 350, the module 125 analyzes the stream of video images in accordance with predetermined criteria characterizing situations occurring in the scene. Thus, in step 440, module 125 identifies a situation occurring in the region of interest as being characterized by an appropriate criterion, and triggers actions related to the directed sensor. In an action 450, the directed sensor 116 or 117 captures a signal, and in an action 460, server 115 broadcasts the captured signal.

Namely, module 125 directs the PTZ video camera 116 to the region of interest for capturing a video signal thereof, and according to an identified situation the active frame stream is replaced on air for a while by the captured signal. For example, if the identified situation calls for a zoom larger than available digitally using a digital zooming capability of a frame stream, then the directed PTZ camera 116 may provide the desired enlarged real zooming capability.

Module 125 may direct the directional microphone 117 to the region of interest and for recording an audio signal generated thereof. Module 125 may select that audio signal for broadcasting as an audio signal of a broadcasted stream of visual images rendered to, the active frame stream.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

The invention claimed is:

1. A method comprising:
    capturing a scene comprising a sport event using a plurality of video cameras, to yield combined frame streams of video images covering together the sport event in its entirety;
    analyzing the combined stream of video images to detect one or more objects associated with a playing object associated with the sport event;
    deriving current and estimated position of the detected one or more objects and of the playing object;
    generating a video production of the sport event by automatically selecting a sequence of portions of the combined stream of video images, wherein the selection is carried out based on predefined video production rules associated with a type of said sport event and further based on the current and estimated position of the detected one or more objects and the playing object;
    estimating, upon losing said playing object by one of said objects, a region occupying said playing object in accordance with previous location thereof, and
    modifying a frame stream of said one or more frame streams to include said region occupying said playing object.

2. The method according to claim 1, wherein the method further includes calibrating said one or more video cameras using points contained within said scene, said points comprising at least one of: corners of the playing field; crossings of two field lines; 11 m penalty kick point; beacon points deployed in the playing field and having locations determined by one or more geodic devices; and a bench related point.

3. The method according to claim 1, wherein said generating of the video production further comprises determining a parameter set defining a frame stream of said one or more frame streams, by three or more parameters selected from group of parameters consisting a left angle, a right angle, a bottom angle, a top angle, a central angular coordinate, a central location coordinate, an aspect ratio, a frame width, a current time flag, a start timestamp, a final timestamp, a frame rate, a resolution parameter; a fixed zoom parameter, an equation defining a dependence of a zoom parameter on a timestamp, and a table of zoom parameter versus a timestamp.

4. The method according to claim 3, wherein said frame width, is determined by at least one parameter of a ground of parameters consisting of predetermined widths a predetermined number of players in the frame, a prohibition flag related to exceeding playing field boundaries, a demand flag related to including a key static object in the frame.

5. The method according to claim 1, wherein the method includes validating an identification of said playing object at a certain time and in certain location by estimating a probability of a playing object presence thereof in view of a playing object orbit before said certain time.

6. The method according to claim 1, wherein the method includes determining a frame center in accordance with at least one variable comprising at least one of: a playing object location, and: a center of mass of said objects locations.

7. The method according to claim 1, wherein the method includes: smoothing a playing object orbit; determining a center frame in accordance with the smoothed playing object orbit, for preventing jerky movement of a frame center orbit.

8. The method according to claim 1, wherein the method includes: identifying a last break in a basketball game; estimating a playing object speed; and determining frame location of blocking a player group in a front side of the last break or in rear side thereof in accordance with said playing object speed.

9. The method according to claim 1, wherein the method includes determining frames of at least one frame stream using a rectangle blocking predetermined portion of the players.

* * * * *